(12) United States Patent
Zhuk et al.

(10) Patent No.: US 7,594,271 B2
(45) Date of Patent: Sep. 22, 2009

(54) METHOD AND SYSTEM FOR REAL-TIME TAMPER EVIDENCE GATHERING FOR SOFTWARE

(75) Inventors: Oscar V. Zhuk, Bellevue, WA (US); Vince M. Rohr, Woodinville, WA (US)

(73) Assignee: Widevine Technologies, Inc., Seattle, WA (US)

( * ) Notice: Subject to any disclaimer, the term of this patent is extended or adjusted under 35 U.S.C. 154(b) by 1541 days.

(21) Appl. No.: 10/668,046

(22) Filed: Sep. 22, 2003

(65) Prior Publication Data

US 2004/0153873 A1    Aug. 5, 2004

Related U.S. Application Data

(60) Provisional application No. 60/412,265, filed on Sep. 20, 2002.

(51) Int. Cl.
*G06F 21/00*    (2006.01)
(52) U.S. Cl. .......................................... 726/24; 713/187
(58) Field of Classification Search ............. 726/22–24; 713/187; 717/127; 714/47
See application file for complete search history.

(56) References Cited

U.S. PATENT DOCUMENTS 4,535,355 A    8/1985    Arn et al.

(Continued)

FOREIGN PATENT DOCUMENTS

EP    658054 B1    6/1995

(Continued)

OTHER PUBLICATIONS

Detecting intrusions using system calls: alternative data models Warrender, C.; Forrest, S.; Pearlmutter, B. Security and Privacy, 1999. Proceedings of the 1999 IEEE Symposium on May 9-12, 1999 pp. 133 -145.*

(Continued)

*Primary Examiner*—Gilberto Barron, Jr.
*Assistant Examiner*—Virginia Ho
(74) *Attorney, Agent, or Firm*—Darby & Darby P.C.; Jamie L. Wiegand (57) ABSTRACT

A method and system are directed to differentiating between normal characteristics and abnormal characteristics within a software process, such that tampering of the software process may be identified programmatically. The identification of behavior that may be defined as normal may vary. Such behavior may include a sequence of selected system level calls that may access resources considered relevant, and the like. Data on the selected behavior is gathered, and when a sufficient amount of abnormal behavior has been detected, a signal may be provided such that an action may be performed. Samples of the gathered data are assigned a unique value. Statistical information is determined from the collected behavior, including trend data. Such trend data is compared to trends identified as normal for the software process, and a determination is made whether the sampled behavior is non-normal.

17 Claims, 5 Drawing Sheets

U.S. PATENT DOCUMENTS

| | | |
|---|---|---|
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 7,240,196 B2 | 7/2007 | Cooper et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |

FOREIGN PATENT DOCUMENTS

| | | |
|---|---|---|
| EP | 714204 B1 | 5/1996 |
| EP | 0886409 | 12/1998 |
| WO | WO96/06504 A1 | 2/1996 |
| WO | WO96/32702 A1 | 10/1996 |
| WO | WO 99/30499 A1 | 6/1999 |
| WO | WO99/54453 A1 | 10/1999 |
| WO | WO 01/35571 A1 | 5/2001 |
| WO | WO-01/93212 A2 | 12/2001 |
| WO | WO 02/21761 A2 | 3/2002 |

OTHER PUBLICATIONS

Intrusion detection using sequences of system calls. Hofmeyr, Steven A.; Forrest, Stephanie; Somayaji, Anil. Journal of Computer Security; 1998, vol. 6 Issue 3, p. 151-180.*
http://www.ntt.co.jp/news/news02e/0209/020927.html, Sep. 27, 2002.
Coverage and Generalization in an Artificial Immune System, Balthrop, et al., 2002.
Video Protection by Partial Content Corruption, C. Griwodz, Sep. 1998.
An Overview of Multimedia Content Protection in Consumer Electronics Devices, Eskicioglu et al.,.
Performance Study of a Selective Encryption Scheme for the Security of Networked, Real-Time Video, Spanos et al., 1995.
Goonatilake, Suran, ed. et al., Intelligent Systems for Finance and Business, 1995, chapters 2-10, pp. 31-173.
Irdeto Access and Optibase create Strategic Alliance—Dec. 14, 2000, http://www.irdetoaccess.com/press/0000041.htm.
System Security, Streaming Media, S. Blumenfeld, Oct. 2001.
http://www.cs.unm.edu/~forest/projects.html, Dec. 2, 2003.
Partial Encryption for Image and Video Communication, H. Cheng, 1998.
A Review of Video Streaming Over the Internet, Hunter et al., Dec. 2, 2003.
Standards Track, Schulzrinne, et al., Apr. 1998, pp. 1-86.
http://www.optibase.com/html/news/December_14_2000.html, Dec. 14, 2004.
Omneon Video Networks Product Announcement, Broadband Streaming, pp. 1-4.
Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.
Wu, Tsung-Li et al., "Selective Encryption and Watermarking of MPEG Video (Extended Abstract)", Feb. 17, 1997, 10 pgs., International Conference on Image Science, Systems, and Technology.

* cited by examiner

METHOD AND SYSTEM FOR REAL-TIME TAMPER EVIDENCE GATHERING FOR SOFTWARE

RELATED APPLICATIONS

This application claims the benefit of U.S. Provisional Application No. 60/412,265 filed on Sep. 20, 2002, which is hereby claimed under 35 U.S.C. §119(e).

FIELD OF THE INVENTION

The present invention relates generally to verifying software functional or procedural integrity, and determining whether a software process is not functioning normally.

BACKGROUND OF THE INVENTION

The software industry relies on virtually billions of lines of software to work as expected. Companies write code, sell code, and rely on processes embodied in the code that is distributed. Unfortunately, once the code leaves the control of the developing company, the code can often be changed or used outside of the context that it was intended.

For example, some software vendors distribute products for playing video or audio files on a user's computer. Some of these packages have internal protection mechanisms that allow video or audio to be protected when used in conjunction with this product. Unfortunately, if a user inserts their own code into the product, or runs another piece of software that captures the computer screen as a movie, they can obtain a copy of the content being played. This is not something that most vendors would like to see occur. Unfortunately, this action currently is outside the context of vendor's product and cannot be easily detected using available technology.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the invention. The following detailed description is, therefore, not to be taken in a limiting sense.

Throughout the specification, the term "connected" means a direct connection between the things that are connected, without any intermediary devices or components. The term "coupled" means a direct connection either between the things that are connected, or an indirect connection through one or more passive or active intermediary devices or components. The meaning of "a," "an," and "the" include plural references. The meaning of "in" includes "in" and "on."

The present invention is directed at providing a method and system for differentiating between normal operational characteristics and abnormal (also called non-normal) operational characteristics such that software product tampering may be identified programmatically. Additionally, the invention provides for a variance for identification of behavior that is defined to be within the realm of normal user behavior.

It has been determined that abnormal behavior may be considered that behavior that is not normal behavior. Detection of normal behavior provides for the ability to detect abnormal behavior. Data is gathered and when a sufficient amount of abnormal behavior has been detected, a signal may be provided such that any of a variety of actions may be performed. Such actions may include, but is not limited to, providing an alert message to a software provider, providing a warning message, shutting down a computing device, software process, and the like.

The invention obtains samples of predetermined traits needed to monitor the software for evidence of tampering. In most cases, this equates to a select number of system level calls that access resources that may be considered important, such as reading and writing to hard drives, memory, network resources, and the like.

Each predetermined trait is assigned a unique number. When a piece of software is running, it produces a stream of data identifying when predetermined traits that need to be monitored are utilized. Each predetermined trait is summarized from the data and statistical information about a trend associated with each trait may be produced.

The trends of the predetermined traits are compared to identified good trends to determine if they are normal. If there is not enough data to determine the trend of the traits exhibited, the result will be that the behavior is unknown. When there is enough data to make a determination, then the result may be normal or abnormal.

Operating Environment

Figure 1:
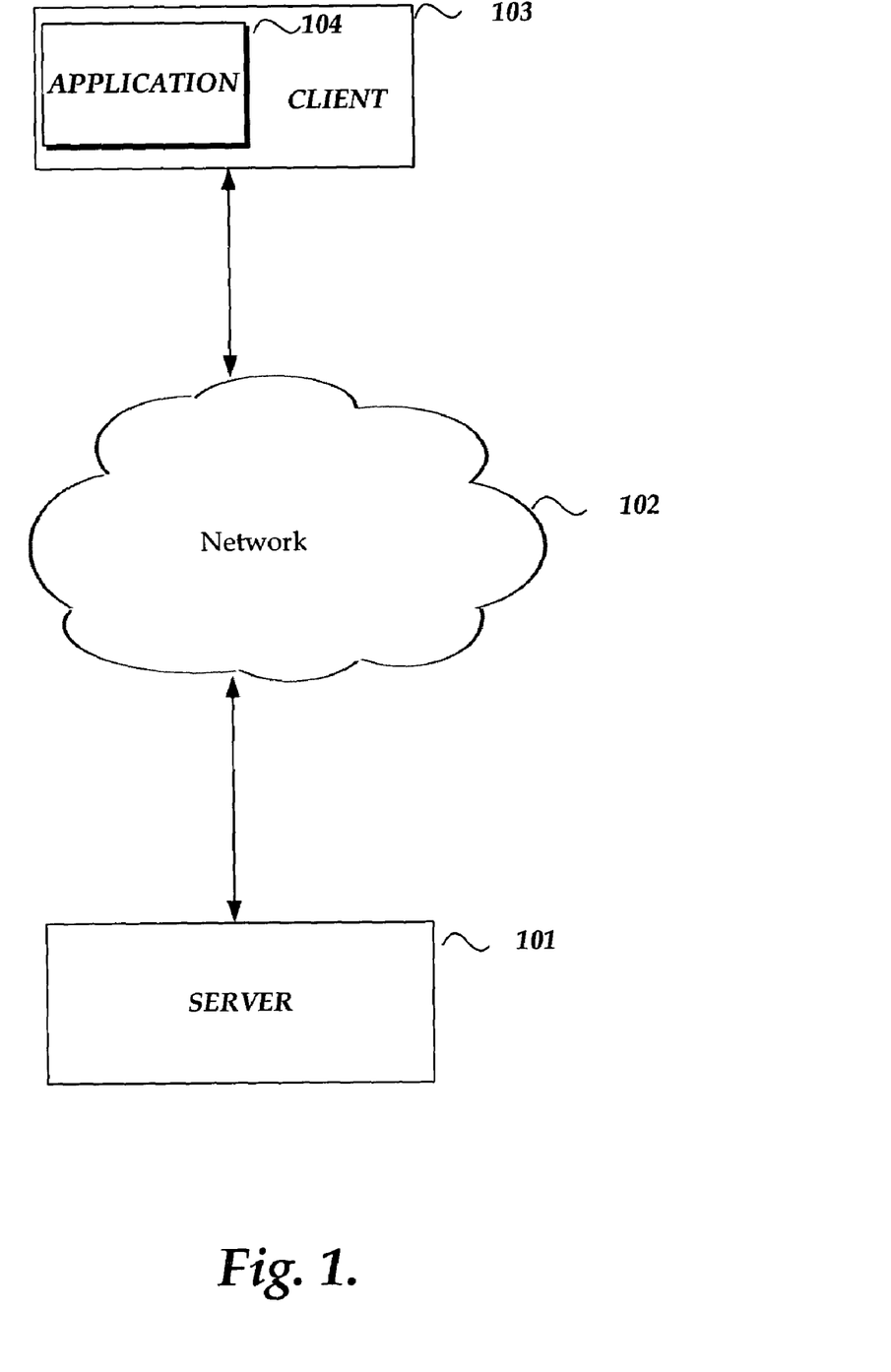
FIG. 1 illustrates an exemplary environment in which the present invention may be practiced.

FIG. 1 shows a schematic block diagram of an exemplary system-operating environment that benefits from the teachings of the present invention. The system includes a server 101, a client 103, and a network 102. The client 103 is coupled to the network, and the server is coupled to the network. The client 103 includes an example application 104 that the integrity is to be determined.

The client 103 may be a computing device, such as portable computer, desktop computer, personal digital assistant (PDAs), a media player, or other similar device that a software application may be exposed to tampering. One embodiment of client 103 is described in more detail below, in conjunction with FIG. 5. Similarly, the server 101 may be any of a variety of similar devices that is arranged to communicate through the network 102 to the client 103.

The network 102 can employ any form of computer readable media for communicating information from one electronic device to another. Also, network 102 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link. A remote computer may act in a number of ways, including as a WWW (content) server or a client with a browser application program.

In FIG. 1, the client 103 is in communication with the network 102 and provides for transmitting application 104 user profiles, software process behavioral information, trait data, and the like, to the server 101. However, the present invention is not limited to network connectivity. For example, the verification of the integrity of application 104 may be performed by components on client 103 without requiring network connectivity.

Therefore, the operating environment shown in FIG. 1 is only one example of a suitable operating environment and is not intended to suggest any limitation as to the scope of use, or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Figure 5:
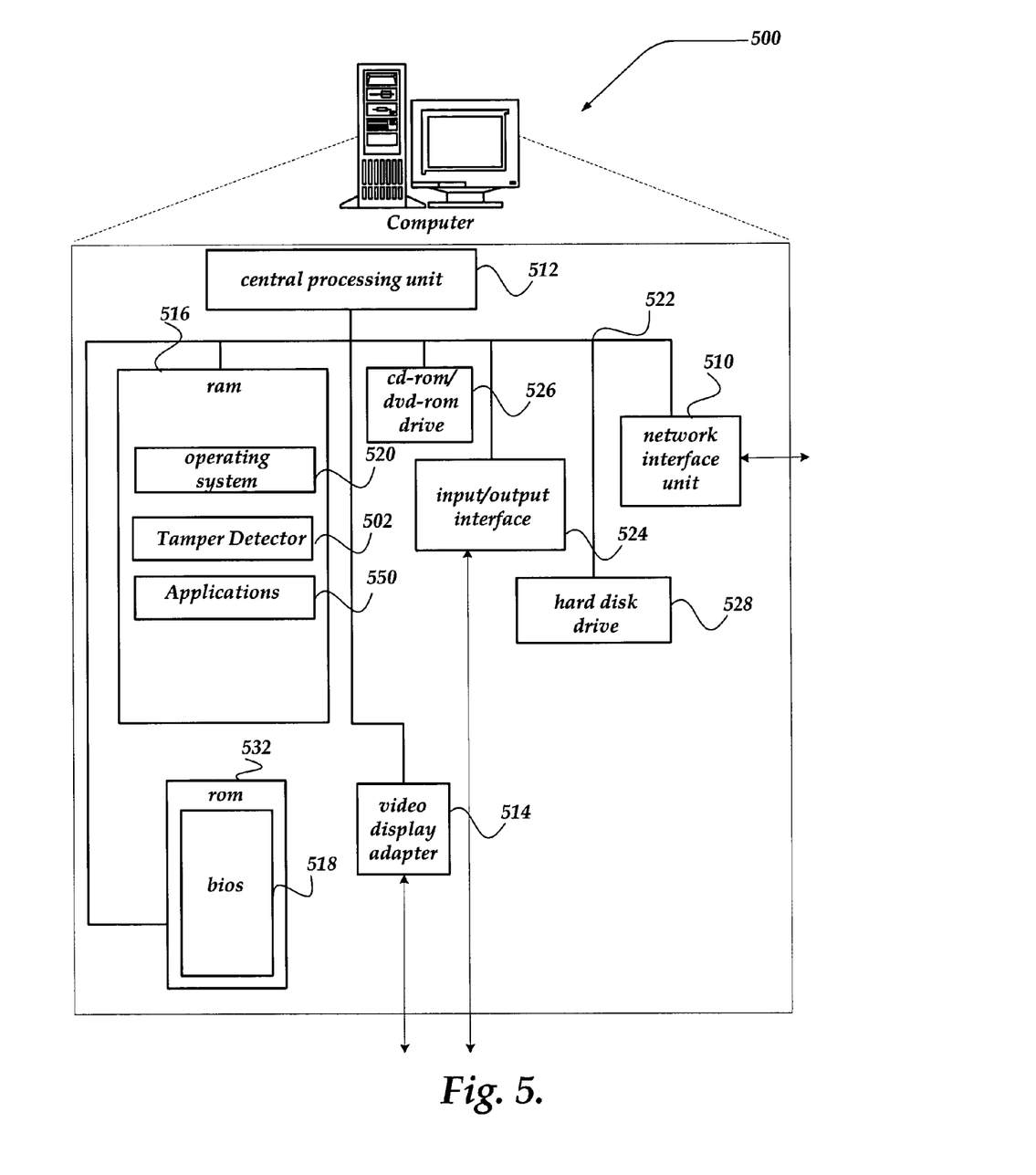
FIG. 5 illustrates one embodiment of a computer in which a tamper detector operates, in accordance with the present invention.

FIG. 5 illustrates one embodiment of a computer in which a tamper detector operates according to one embodiment of the invention. Computer 500 illustrates one embodiment of client 103 shown in FIG. 1. Computer 500 may also be employed to illustrate one embodiment of server 101 shown in FIG. 1. Computer 500 may include many more components than those shown. The components shown, however, are sufficient to disclose an illustrative embodiment for practicing the invention.

Computer 500 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of computer 500. Any general-purpose operating system may be employed. Basic input/output system ("BIOS") 518 is also provided for controlling the low-level operation of computer 500.

As illustrated in FIG. 5, computer 500 also can communicate with the Internet, or some other communications network, such as network 102 in FIG. 1, via network interface unit 510, which is constructed for use with various communication protocols including the TCP/IP protocol. Network interface unit 510 is sometimes known as a transceiver or transceiving device.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

In one embodiment, the mass memory stores program code and data for implementing operating system 520. The mass memory may also store additional program code and data for performing the functions of computer 500, and tamper detector 502. One or more applications, such as application 104 when computer 500 is employed to illustrate client 103 of FIG. 1, tamper detector 502, and the like, may be loaded into mass memory and run on operating system 520.

While computer 500 illustrates tamper detector 502 as a component, the present invention is not so limited. For example, tamper detector 502 may operate within a server, such as server 101 in FIG. 1. Tamper detector 502 may also be decomposed into several components, some of which operate within a server, and other components may operate within a client, without departing from the scope of the present invention.

Computer 500 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Computer 500 also includes input/output interface 524 for communicating with external devices, such as a mouse, keyboard, scanner, or other input devices not shown in FIG. 5. Likewise, computer 500 may further include additional mass storage facilities such as CD-ROM/DVD-ROM drive 526 and hard disk drive 528. Hard disk drive 528 is utilized by computer 500 to store, among other things, application programs, databases, and the like.

Generalized Operation

Described below is one embodiment of a process flow for employing graphical representations, such as chaos game representations, and the like, for evaluating evidence of tampering of software.

The process begins by determining the main components related to the application processes of interest.

Virtually every application process may be considered as a set of system calls, which include organized system sequences, and which may be ranked by a limited length. When comparing two different data sets, where one represents the pattern and the other data set represents a prototype, the process employs two major components of that data, Consequence and Frequency. Comparing the two different data sets includes a comparison of consequences and frequencies of certain system calls. However, the present invention is not limited to consequence and frequency, and other components of the data may be employed without departing from the scope of the invention.

The terms "pattern," "pattern data," and the like, refer to a set of data that represents a behavior that is determined to be normal for a given software process, application, and the like. The terms, "prototype," "prototype data," and the like refer to another set of data that represents a behavior of the given software process, application, and the like. Prototype data may be compared to the pattern data to determine whether the software process is considered to have been tampered with.

Creating a Fingerprint as a Consequence Pattern

The process begins by calculating consecutive data for a sequence of file system calls for what is considered to be an unhacked (normal) application process. Various approaches related to graphing representations, and the like, may be employed for analyzing the data. In one embodiment Chaos Game Representation (CGR) is employed to convert the calculated data to CGR dot-data. The obtained CGR dot-data is then converted to the radius-vector data as a fingerprint.

Vector analysis rules are employed for processing the data. Newly created radius vectors are substituted with just one as a pattern from the fingerprint. The pattern is then trained for better matching the real situation.

When the created vector becomes saturated or matured, the X and Y coordinates of the ending point of the created vector (the origin point of the created vector already has (0, 0) coordinates assigned by default) are retained. A general condition that may indicate that the vector is saturated and mature includes the event when a difference between two measurements of sequence errors, ER1 and ER2, for substantially the same pattern or prototype is equal to or less then a preliminary assigned value Val:

$|ER1-ER2|<=Val$

Next, the process verifies the vector stability through the next 50-100 new system calls. When the vector stability is verified, the number of system calls is assigned to one vector, and the process starts again at creating new dot-data until the new vector is generated. Once the stable vector has been processed, the statistics are reinitialized in preparation for the next vector. By continuing the process, a sequence of vectors is created, which represent all changes in the sequence of the data that have occurred.

Creating a Fingerprint as a Frequency Pattern

A fingerprint for the frequency pattern data may be obtained by calculating a sum of substantially every type of system call that appears in the data processing as well as the total number of system calls that are made.

Figure 3:
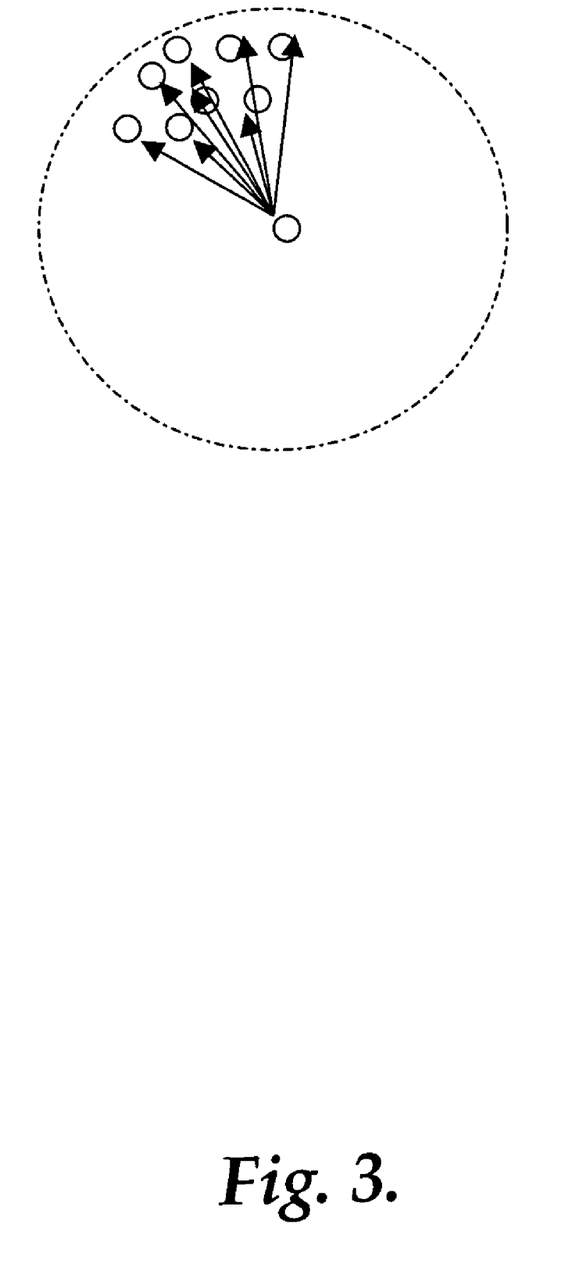
FIG. 3 illustrates an example of a general Chaos Game Representation (CGR) plot with a possible pattern for a consequence vector, Ap.

A vector is created by adding up all of the average directional vectors. FIG. 3 illustrates an example of a general Chaos Game Representation (CGR) plot with a possible pattern for a consequence vector.

The maximal range of such determined values of system calls as Write, Read, Seek, or the like is obtained. These are retained as pattern values.

The process continues to create the new data until the next saturated and mature vector representing the consequence pattern appears. Continuing the process, the sequence of patterns is created, which represent substantially all changes of frequency in the data that happened virtually in real time to each kind of the system calls.

Creating Fingerprints in Real Time as the Prototypes to Consequence and Frequency Patterns The process continues by calculating the consequence data of the file system calls and frequency numbers for the tested application virtually in real time. The process steps described above for the creating of consequence and frequency patterns are continued.

Decision-Making

The process next creates a way of analyzing and comparing the real time data to the pattern data. The process runs the decision engine to obtain the results. Each pattern, created as described above, is created separately for the applications of any known kinds and any known computer platforms the user might use and for which the integrity is sought.

Figure 2:
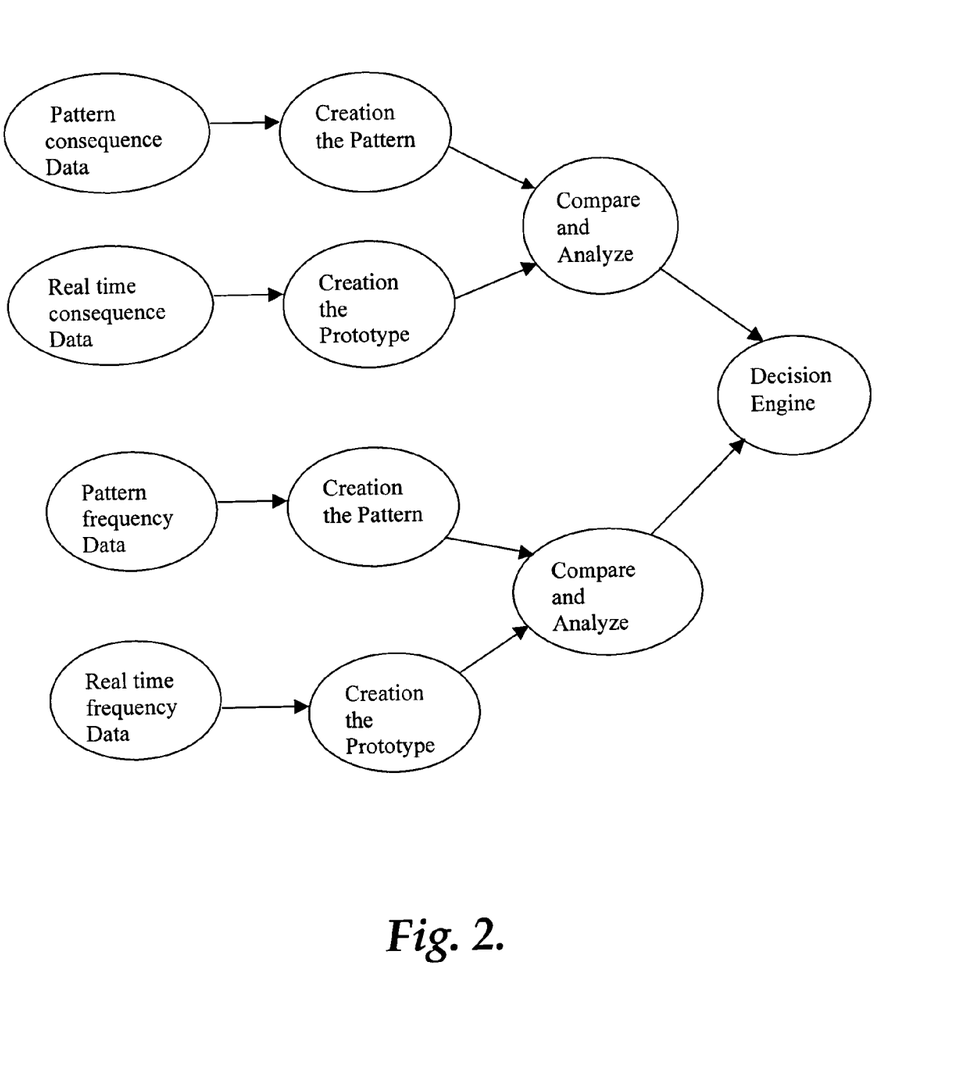
FIG. 2 illustrates a flow diagram showing one embodiment for a process of determining real-time tamper evidence of a software process.

FIG. 2 illustrates the stages for the four independent processes that are employed for obtaining the results.

Consequence Pattern and Prototype Creation

Initially, the Chaos Game Representation (CGR) scatter plot is determined. Next, the process creates the X and Y coordinates axis through the center of the circle. An assumption may be made that virtually every point is considered as a radius vector representative with the origin (0, 0) point.

The set of the created vectors is considered as a fingerprinting field for the patterns. To create a pattern-vector Ap and keep it in the unit circle range the process determines the average sum of all vectors.

$Aj(j=1,N)$ created on the CGR:

$$A_p = A_1 + A_2 + A_3 + \ldots + A_j + \ldots + A_N \equiv 1/N \sum_{j=1}^{N} Aj$$

where N is a number of all points in the CGR.

In coordinates form, the Ap vector is:

$A_p\{X_p, Y_p\}$ where $X_p = 1/N * \sum_{j=1}^{N} Xj$ and $Y_p = 1/N * \sum_{j=1}^{N} Yj$.

The new obtained vector $A_p$ inherits the information from each of the N vectors. The previously created vectors (or points) are substituted with one newly created vector $A_j$ with $X_p$ and $Y_p$ coordinates. The new vector, $A_p$, accumulates substantially all sets of behaviors represented by the CGR. Thus, only one radius vector coordinates are retained for each created pattern rather than thousand of points. This improves the efficiency of memory usage and software performance. The process of obtaining the pattern-vector requires fewer computer operations such as additions.

Frequency Pattern and Prototype Creation

The process for creating frequency patterns or prototypes is described above. The process calculates and cumulates the sum for virtually each type of happened system calls for each sample of given length.

A CGR is created employing the following process. Typically, the number of points K that are equal to or less than the number of possible or chosen system calls is employed. Virtually every new calculated point for virtually each kind of system call may be located on the line between center and a point on the circle surface that represent this kind of system call. Virtually every point represents the vector vertices at the given direction (same as an angle).

The length $L_1$ of the newly created vector represents the frequency of its appearance and can be determined from the formula:

$$L_1 = 1/TNC * \sum_{i=1}^{M} Pi$$

where TNC is a total number of system calls, $P_j$ is a single point, and M is a total number of calculated points for this type of system call.

Furthermore, $$\sum_{i=1}^{K} Li <= 1$$

In creating a pattern vector Pp (employing substantially the same approach for the prototype vector) an average sum of all vectors Pj (j=1, K) created on the CGR is determined:

$$P_p = P_1 + P_2 + P_3 + \ldots + P_j + \ldots + P_K \equiv 1/K \sum_{j=1}^{K} Pj$$

where K is a number of all system calls (vectors) in the CGR. In the coordinate form, the Pp vector substantially is:

$$P_p\{X_p, Y_p\}$$

$$\text{where } X_p = 1/K * \sum_{j=1}^{K} Xj \text{ and } Y_p = 1/K * \sum_{j=1}^{K} Yj$$

Figure 4:
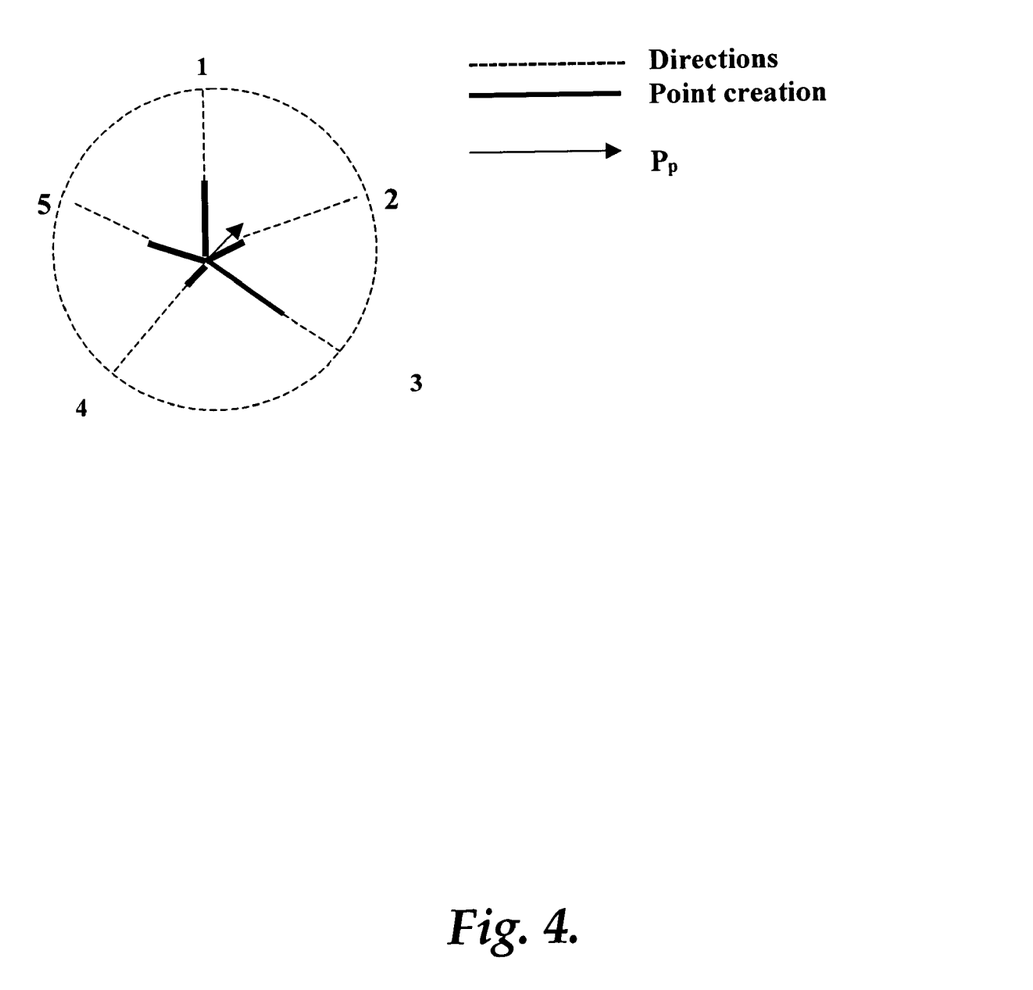
FIG. 4 illustrates an example of a possible pattern vector, Pp, where system calls frequencies are substantially equal.

The newly obtained vector $P_p$ inherits the information from the K vectors. FIG. 4 illustrates an example of a possible pattern vector, Pp, where system calls frequencies are substantially equal. In the example shown in FIG. 4, K=5.

Determining Normal from Non-Normal Behavior

When incoming data with real time points needs to be processed, the fingerprinting fields of the consequence vector-prototype and the frequency vector-prototype are produced. These are compared to the corresponding vectors-pattern. Analyzing the results, a final decision may be determined.

The process, which is virtually the same for all comparisons, is given below.

Two different vectors $A_p$ and $B_{pr}$ are compared by their norms and angle between the vectors. The formula for determining the angle between the two given vectors $A_p$ and $B_{pr}$ can be represented as the following:

$$\cos(Ap, Bpr) = (X_1 * X_2 + Y_1 * Y_2)/(|A_p| * |B_{pr}|)$$

$$= (X_1 * X_2 + Y_1 * Y_2)/\left(\sqrt{X_1^2 + Y_1^2} * \sqrt{X_2^2 + Y_2^2}\right)$$

Consideration is typically given to the upper (nominator) part of the given fraction because it has practical influence on the preliminary results of analysis and more weight for the further decisions. For example, the following three situations may arise, where the nominators could be as the following:

$$X_1 * X_2 + Y_1 * Y_2 = 0 \quad\quad 1.$$

$$X_1 * X_2 + Y_1 * Y_2 < 0 \quad\quad 2.$$

$$X_1 * X_2 + Y_1 * Y_2 > 0 \quad\quad 3.$$

Equation 1 above illustrates that an angle between vectors $A_p$ and $B_{pr}$ is 90 degrees and vectors are perpendicular.

Equation 2 above illustrates that vectors $A_p$ and $B_{pr}$ have an opposite direction.

Equations 1 and 2 thus illustrate that substantial abnormality, and as such are ready for a decision to be determined. Equation 3 above illustrates a final decision, and is explained below.

One approach for determining normal from non-normal behavior with respect to equation 3 above that enables reasonable and confident results is described next.

The approach begins by determining a norm $N_1$ of vectors $A_p$ and $B_{pr}$ sum:

$$N_1 = |A_p + B_{pr}| = \sqrt{(X_1 + X_2)^2 + (Y_1 + Y_2)^2}.$$

Next, a norm $N_2$ of vectors $A_p$ and $B_{pr}$ difference is determined as:

$$N_2 = |A_p - B_{pr}| = \sqrt{(X_1 - X_2)^2 + (Y_1 - Y_2)^2}$$

It is then determined how vectors Ap and Bpr are similar by using their directions:

$$E_1 = 1 - (N_1 - N_2)/N_1 = N_2/N_1.$$

The norm Np and Npr of vectors Ap and Bpr are determined by:

$$N_p = \sqrt{X_1^2 + Y_1^2}$$

$$N_{pr} = \sqrt{X_2^2 + Y_2^2}.$$

Similarity of vectors Ap and Bpr may be determined by employing their lengths, using the following equation:

$$E_2 = |N_p - N_{pr}|/N_p.$$

One way to determine a total difference, ER, between vectors Ap and Bpr may also be represented as:

$$ER = \max(E_1, E_2).$$

The total difference may also be represented by a percentage measurement, as:

$$ER\% = \max(E_1, E_2) * 100\%.$$

Next, a Confidence level, CL, or fitting Probability, FP, may be determined by:

$$CL = FP = 1 - ER.$$

Similarly, a percentage of the confidence level may be determined as:

$$CL\% = FP\% = 100\% - ER\%.$$

Now, if the value for the confidence level shows that the maximum difference between vectors Ap and Bpr, and their direction, can be trusted, then a determination may be made as whether the process's behavior is normal or non-normal. For determining a final result, a comparison between one of a priori set values, mentioned above, and one of obtained set values during the newest calculation such as ER, or ER % or CL, or FP, or CL %, or FP %, may be performed.

A degree of trust may be obtained for the result based in part on the maximal error. Thus, for example, if the maximal error calculated is inside or on the border of the preliminary assigned error interval, the result may be determined to indicate normal behavior of the software process.

When the results of all comparisons (say 2×3=6) are obtained, then the process creates the procedure for the final decision.

While the above disclosure employed Chaos Game Representations, those skilled in the art will recognize that the invention is not limited to such implementation and other graphical representation schemes may be employed without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for verifying integrity of a computing process, comprising:
   determining a trait associated with the computing process;
   determining a pattern statistic associated with the trait based in part on an execution of the computing process in a normal condition, wherein determining the pattern statistic further comprises:
      determining consecutive data associated with the trait;
      employing a graphical representation to convert the consecutive data to a radius-vector;
      if the radius-vector is mature, retaining an endpoint coordinate associated with the radius-vector;
      determining a frequency pattern associated with the trait; and
      employing the graphical representation in part to convert the frequency pattern to an average directional vector;
   determining a prototype statistic associated with the trait based in part on another execution of the computing process in another condition;
   comparing the pattern statistic to the prototype statistic; and
   if the comparison indicates abnormal behavior the computing process, performing a predetermined action.

2. The method of claim 1, wherein performing the predetermined action further comprises performing at least one of sending an alert message, and disabling the computing process.

3. The method of claim 1, wherein the trait further comprises at least one system level call.

4. The method of claim 1, wherein determining the pattern statistic and the prototype statistic further comprises:
   determining a trend associated with the trait during execution of the computing process in the normal condition; and
   determining another trend associated with the trait during the other execution of the computing process in the other condition.

5. The method of claim 1, wherein comparing the pattern statistic to the prototype statistic further comprises comparing the frequency pattern and a consequence associated with the pattern statistic to another frequency pattern and another consequence associated with the prototype statistic.

6. The method of claim 1, wherein the mature radius-vector further comprises satisfying a condition wherein an absolute difference between a first sequence error and a second sequence error is less than or equal to a predetermined value.

7. The method of claim 1, wherein employing the graphical representation further comprises employing a chaos game representation (CGR) plot.

8. The method of claim 1, wherein comparing the pattern statistic to the prototype statistic further comprises comparing a vector norm and angle to another vector norm and another angle.

9. The method of claim 1, wherein comparing the pattern statistic to the prototype statistic further comprises:
   determining a pattern vector associated with the pattern statistic, wherein the pattern vector includes a direction and length;
   determining a prototype vector associated with the prototype statistic, wherein the prototype vector includes another direction and another length;
   determining a total difference between the pattern vector and the prototype vector; and
   if the total difference is outside a predetermined confidence level, indicating that the prototype statistic is associated with abnormal behavior.

10. An apparatus encoded with computer-executable components for determining tamper evidence of a client process, comprising:
    a transceiver arranged to receive and forward data;
    a processor, coupled to the transceiver, having instructions arranged to perform actions, including:
       determining a trait associated with the client process;
       receiving a first set of data associated with the trait based in part on execution of the client process in a normal condition;
       receiving a second set of data associated with the trait based in part on another execution of the client process in another condition;
       determining a pattern statistic associated with the first set of data, wherein determining the pattern statistic further comprises:
          determining consecutive data associated with the trait;
          employing a graphical representation to convert the consecutive data to a radius-vector;
          if the radius-vector is mature, retaining an endpoint coordinate associated with the radius-vector;
          determining a frequency pattern associated with the trait; and
          employing the graphical representation to convert the frequency pattern to an average directional vector;
       determining a prototype statistic associated with the second set of data;
       comparing the pattern statistic to the prototype statistic; and
       if the comparison indicates abnormal behavior of the client process, performing a predetermined action.

11. The apparatus of claim 10, wherein the computer-executable components reside in at least one of a server, and a client.

12. The apparatus of claim 10, wherein performing the predetermined action further comprises performing at least one of sending an alert message, and disabling the client process.

13. The apparatus of claim 10, wherein the trait further comprises at least one system level call.

14. The apparatus of claim 10, wherein determining the pattern statistic and the prototype statistic further comprises:
   determining a trend associated with the trait during execution of the client process in the normal condition; and
   determining another trend associated with the trait during the other execution of the client process in the other condition.

15. The apparatus of claim 10, wherein the mature radius-vector further comprises satisfying a condition wherein an absolute difference between a first sequence error and a second sequence error is less than or equal to a predetermined value.

16. The apparatus of claim 10, wherein employing the graphical representation further comprises a chaos game representation (CGR) plot.

17. The apparatus of claim 10, wherein comparing the pattern statistic to the prototype statistic further comprises:
   determining a pattern vector associated with the pattern statistic;
   determining a prototype vector associated with the prototype statistic;
   determining a total difference between the pattern vector and the prototype vector; and
   if the total difference is outside a predetermined confidence level, indicating that the prototype statistic is associated with abnormal behavior.

* * * * *